(12) United States Patent
Threlkeld

(10) Patent No.: US 6,502,121 B1
(45) Date of Patent: Dec. 31, 2002

(54) SYSTEM AND METHOD FOR PROCESSING A RECURRENT OPERATION

(75) Inventor: Timothy Patrick Threlkeld, Boulder, CO (US)

(73) Assignee: J. D. Edwards World Source Company, Denver, CO (US)

( * ) Notice: Subject to any disclaimer, the term of this patent is extended or adjusted under 35 U.S.C. 154(b) by 0 days.

(21) Appl. No.: 09/239,025

(22) Filed: Jan. 27, 1999

(51) Int. Cl.[7] .......................... G06F 9/00; G06F 157/00
(52) U.S. Cl. .......................... 709/100; 709/102; 705/8; 705/10; 705/17; 705/39
(58) Field of Search .......................... 709/100, 101, 709/102, 103, 201, 203, 216, 217, 228; 705/37; 370/321; 702/62

(56) References Cited

U.S. PATENT DOCUMENTS

| | | | | |
|---|---|---|---|---|
| 4,009,347 | * | 2/1977 | Flemming et al. | 370/321 |
| 4,025,760 | * | 5/1977 | Trenkamp | 705/73 |
| 4,032,931 | * | 6/1977 | Haker | 341/23 |
| 4,075,460 | * | 2/1978 | Gorgens | 235/420 |
| 4,091,448 | * | 5/1978 | Clausing | 235/379 |
| 4,114,027 | * | 9/1978 | Slater et al. | 705/43 |
| 4,186,438 | * | 1/1980 | Benson et al. | 711/113 |
| 4,319,336 | * | 3/1982 | Anderson et al. | 705/21 |
| 6,058,378 | * | 5/2000 | Clark et al. | 705/37 |

* cited by examiner

Primary Examiner—Majid A. Banankhah
(74) Attorney, Agent, or Firm—Sheridan Ross P.C.

(57) ABSTRACT

The processing system includes a storage device for maintaining entity information including period information indicative of information processing periods for the entity. A scheduling application defines application processing information for a desired processing job and identifies the processing job as being recurrent. A function routine determines recurrence information including a set of processing start times corresponding to the information processing periods and the application processing information associated with the processing job. A launch application accesses the recurrence information to identify a current one of the start times, and submits the processing job corresponding to the current start time for processing.

18 Claims, 8 Drawing Sheets

SYSTEM AND METHOD FOR PROCESSING A RECURRENT OPERATION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A "MICROFICHE APPENDIX"

Not applicable.

BACKGROUND OF THE INVENTION

1. Technical Field

The present invention relates in general to a system and method for processing an application information processing operation. The invention more particularly relates to a system and method for processing a recurrent application information processing operation according to information processing periods specified for an entity.

2. Background Art

Managing the various activities of a large business or enterprise has been a complicated undertaking, especially where the enterprise is composed of many different business entities dispersed geographically across a city, state, nation or the entire world. To help coordinate the activities of the business entities, many enterprises implemented enterprise resource planning (ERP) software systems. The ERP software systems enabled the enterprises to integrate all of their business information and functions, such as manufacturing, payroll, and supply chain functions, into a single system so that each business entity within a respective enterprise would have access to the information and functions.

An important benefit of the ERP software systems has been the ability to process information, or prepare reports, for the enterprise that enable business executives and other decision makers to analyze the operations of the associated business entities. By selecting a business entity to analyze, designating the desired information to process, and manually selecting a desired time for processing, it was possible to process the information or report for the selected business entity at the desired time.

While such known processing operations were suitable for a one-time information processing operation performed at a time selected by a user, they were not suitable for processing information on a recurring basis according to a fiscal date pattern for the selected entity. In this regard, the user was required to schedule the multiple processing times by manually selecting each one of the processing times. For each processing time corresponding to the fiscal date pattern, there existed the possibility of the introduction of an error, thereby making the resulting processed information less reliable. Furthermore, the time to make the required selections was completely unsatisfactory where information for more than one entity was to be processed.

Therefore, it would be highly desirable to have a new and improved system and method for processing recurrent information processing operations, wherein the introduction of errors is substantially reduced. Such a processing system should enable the scheduling of recurrent information processing jobs in a quick and easy manner.

Further complicating the processing of recurrent information processing operations was the dispersal of the business entities across multiple time zones. Consequently, scheduling the processing operations according to one time zone did not necessarily result in the processing operation occurring at a desired time in another time zone.

Therefore, it would also be highly desirable to have a new and improved system and method for processing recurrent information processing operations that accommodate processing operations in more than one time zone.

SUMMARY OF THE INVENTION

Therefore, the principal object of the present invention is to provide a new and improved system and method for processing recurrent information processing operations which substantially reduces the entry of errors, and which can be utilized in a quick and easy manner. Such a system and method should also facilitate the processing of information processing in more than one time zone.

Briefly, the above and further objects of the present invention are realized by providing a new and improved system and method for processing recurrent information processing operations without requiring substantial input from a user, and which facilitates processing in more than one time zone.

The processing system includes a storage device for maintaining entity information including period information indicative of information processing periods for the entity. A scheduling application defines application processing information for a desired processing job and identifies the processing job as being recurrent. A function routine determines recurrence information including a set of processing start times corresponding to the information processing periods and the application processing information associated with the processing job. A launch application accesses the recurrence information to identify a current one of the start times, and submits the processing job corresponding to the current start time for processing.

BRIEF DESCRIPTION OF THE DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
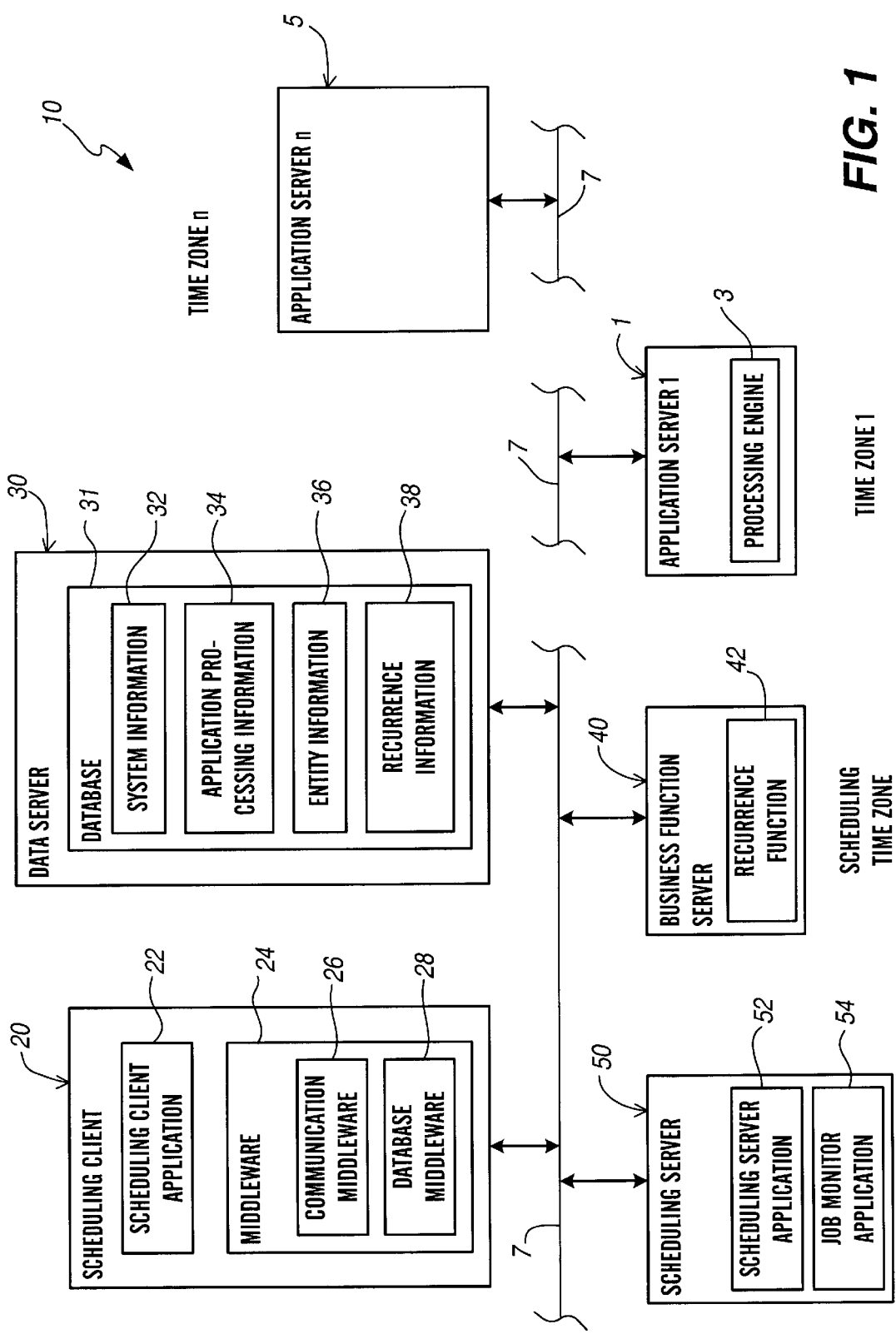
FIG. 1 is a block diagram of a system for processing recurrent processing operations, which is constructed in accordance with the present invention.

Referring now to the drawings, and more particularly to FIG. 1 thereof, there is shown a system 10 for processing a recurrent processing job and which is constructed in accordance with the present invention. The system 10 includes a group of application servers, including servers 1 and 5 geographically dispersed across a plurality of time zones and each having a processing engine 3, for selectively processing application processing information according to the method of the present invention. A network 7 connects the servers 1 and 5 to a scheduling client 20, a data source or server 30, a business function server 40 and a scheduling server 50 to define a local area network (LAN) or a wide area network (WAN).

In operation, the data server 30 maintains entity information for a desired entity. The entity information includes period information indicative of predefined information processing periods for the entity. The scheduling client 20 is responsive to a user (not shown) to define application processing information for a desired application processing job associated with the entity, and to identify the processing job as a recurrent processing job. Once the processing job is identified as a recurrent processing job, the business function server 40 facilitates the determination of recurrence information 38. The recurrence information 38 includes a set of processing start times corresponding to information processing periods for the entity, and information identifying the processing job associated with the start times.

The scheduling server 50 monitors the recurrence information 38 to determine if one of the processing start times is substantially current. After a current processing start time is identified by the scheduling server 50, the processing job corresponding to the current processing start time is submitted to one of the servers 1 and 5 for processing by the processing engine 3.

Considering now the scheduling client 20 in greater detail with respect to FIG. 1, the scheduling client 20 includes a scheduling client application 22 that is responsive to the user input for defining the application processing information to be processed by the servers 1 and 5 as the desired processing job. In the preferred embodiment of the present invention, the processing job is a batch application, and the application processing information defines a report for a selected company or entity and the server 1 and 5 which will generate the report. One skilled in the art will understand that the processing job could also define a workflow application.

The application processing information includes report format information and processing options information for the report that determine the appearance and content of the report. The scheduling client application 22 is further responsive to the user input for identifying the initial processing start date for the processing job, and for identifying the processing job as a one time only processing job or as a recurrent processing job.

The scheduling client 20 further includes a middleware application 24 having a communication middleware component 26 and a database middleware component 28. The component 26 facilitates the communication of application launch or dispatch messages to the scheduling server 50 as described in more detail in connection with FIG. 5. The component 28 facilitates the accessing of information in the data server 30. One skilled in the art will understand that the data server 30, the business function server 40, the scheduling server 50 and the servers 1 and 5 may also have middleware applications (not shown) to facilitate communication across the network 7.

The data server 30 includes a database 31 for maintaining the entity information 36 for the entity. The entity information 36 includes period information for the entity, such as the entity's fiscal date pattern, that is indicative of the information processing periods for the entity. The information processing periods correspond to the number of reports to be generated for the entity during a given fiscal year. In addition to the period information, the entity information 36 may also include other information pertaining to the entity, including any information relating to the entity that is to be included in the report. The entity information 36 may also include entity information for a group of entities forming an enterprise including the selected entity.

In addition to maintaining the entity information 36, the database 31 maintains the application processing information 34 and the recurrence information 38, as well as system information 32. Although the system information 32, the application processing information 34, the entity information 36 and the recurrence information 38 are described and shown as being maintained in the same data server 30, the information 32, 34, 36 and 38 could be maintained on two or more data servers.

The recurrence information 38 includes processing start times for all processing jobs to be processed by the servers 1 and 5. By maintaining the recurrence information 38 on the database 31, the scheduling server 50 can simply monitor the recurrence information 38 on the database 31 for launching the processing jobs on all of the servers 1 and 5.

The system information 32 includes server location information, server protocol information, and other information that facilitates the accessing and transmission of information between the scheduling client 20, the data server 30, the business function server 40, the scheduling server 50 and the servers 1 and 5.

The business function server 40 includes a recurrence function routine 42 that can be accessed from the network 7 to determine or revise the recurrence information 38, including the set of processing start times for the recurrent processing job. The recurrence function routine 42 is responsive to the scheduler client 20 indicating a recurrent processing job is desired to access the entity information 36, including the information processing periods associated with the entity, to determine the set of processing start times. For example, where the entity information 36 indicates the selected entity has a fiscal date pattern requiring four processing operations per fiscal year, the recurrence function routine 42 determines four processing starting times for the entity's processing jobs that correspond to the required fiscal date pattern.

As shown in FIG. 1, the application servers 1 and 5 are located in Time Zone 1 and Time Zone n while the scheduling client 20 is located in a Scheduling Time Zone. To facilitate the scheduling of processing jobs that will be processed in a different time zone from where the processing jobs were originally scheduled, the processing start times of the recurrence information 38 are maintained in a decentralized time format. In this regard, the processing start times are all stored in the database 31 in a universal coordinated time (UTC) format. The use of the UTC format enables the start times for all processing jobs to have a common basis that is not dependent upon the time zones where the jobs were scheduled or where the jobs will be processed. Consequently, the processing jobs can be launched on the servers 1 and 5 according to the processing start times without regard to the Scheduling Time Zone, Time Zone 1 or Time Zone n.

The UTC standard measures the elapsed seconds since midnight of Jan. 1, 1970, in Greenwich, England. For 32 bit-processing systems, the maximum value for UTC data is 4,294,967,295. Using the standard measure of elapsed seconds, the maximum value for a newly defined starting time would only be about 136 years from Jan. 1, 1970. The usefulness of the UTC format can be extended for over 8,000 years beyond Jan. 1, 1970, by using elapsed minutes rather than elapsed seconds.

In order to determine the proper start times for a processing job, time zone information for the server 1 and 5 which will process the processing job is used to either increase or decrease the UTC. This enables the processing start times for all of the processing jobs for any one of the servers 1 and 5 to be adjusted according to the time zone, such as Time Zone 1 and Time Zone n, associated with the servers 1 and 5.

Once the processing start times are determined, the recurrence function routine 42 causes the processing start times, and the information identifying the processing job associated with the start times, to be stored in the database 31 as the recurrence information 38.

A scheduling server application 52 on the scheduling server 50 reads or accesses the recurrence information to determine how long the scheduling application server 52 can "sleep" until a new job must be launched. In this regard, the set of processing starting times includes a range of starting times from the earliest processing starting time to the latest processing starting time. When the scheduling server application 52 awakes, the scheduling server 50 causes the application processing information for the processing job corresponding to the earliest starting time to be submitted to an appropriate one of the servers 1 and 5 for processing.

The scheduling server application 52 is preferably maintained in a "sleep" state to reduce the network traffic on the network 7. A dispatch message generated by the communication middleware 28 is transmitted periodically to the scheduling server application 52 to "awake" the scheduling server application 52, and to determine if a processing job should be launched. An idle or sleep period of one minute or more between the transmission of dispatch messages is preferred.

The scheduling client 20 can cause a signal to be transmitted to the scheduling server 50 to awaken the scheduling server application 52 immediately, and to check for newly added processing jobs that are scheduled to be launched prior to the next scheduled awake time.

The scheduling server application 52 also enables additional processing start times to be determined when required. In this regard, a particular processing job can have a predetermined number of processing start times. Where a processing end date is not specified by the user for the processing job, the launching of the processing job at the earliest one of the processing start times causes the number of remaining processing start times to be one less than the predetermined number.

The scheduling server application 52 is responsive to a determination that the number of remaining processing start times is one less than the predetermined number to invoke the recurrence function routine 42 for determining a new processing start time. When invoked, the recurrence function routine 42 accesses the entity information 36 to determine the next processing start time following the latest of the existing processing start times. The recurrence function routine 42 then causes the next processing start time, and information identifying the processing job associated with the next processing start time, to be stored as part of the recurrence information 38.

The scheduling server 50 further includes a job monitor application 54 for monitoring the processing of the application processing jobs to determine, for example, if the jobs were successfully processed, if the jobs should be resubmitted, if the number of job re-submissions exceeds an allowable threshold, and if the jobs were processed within an allowable time frame.

Figure 2:
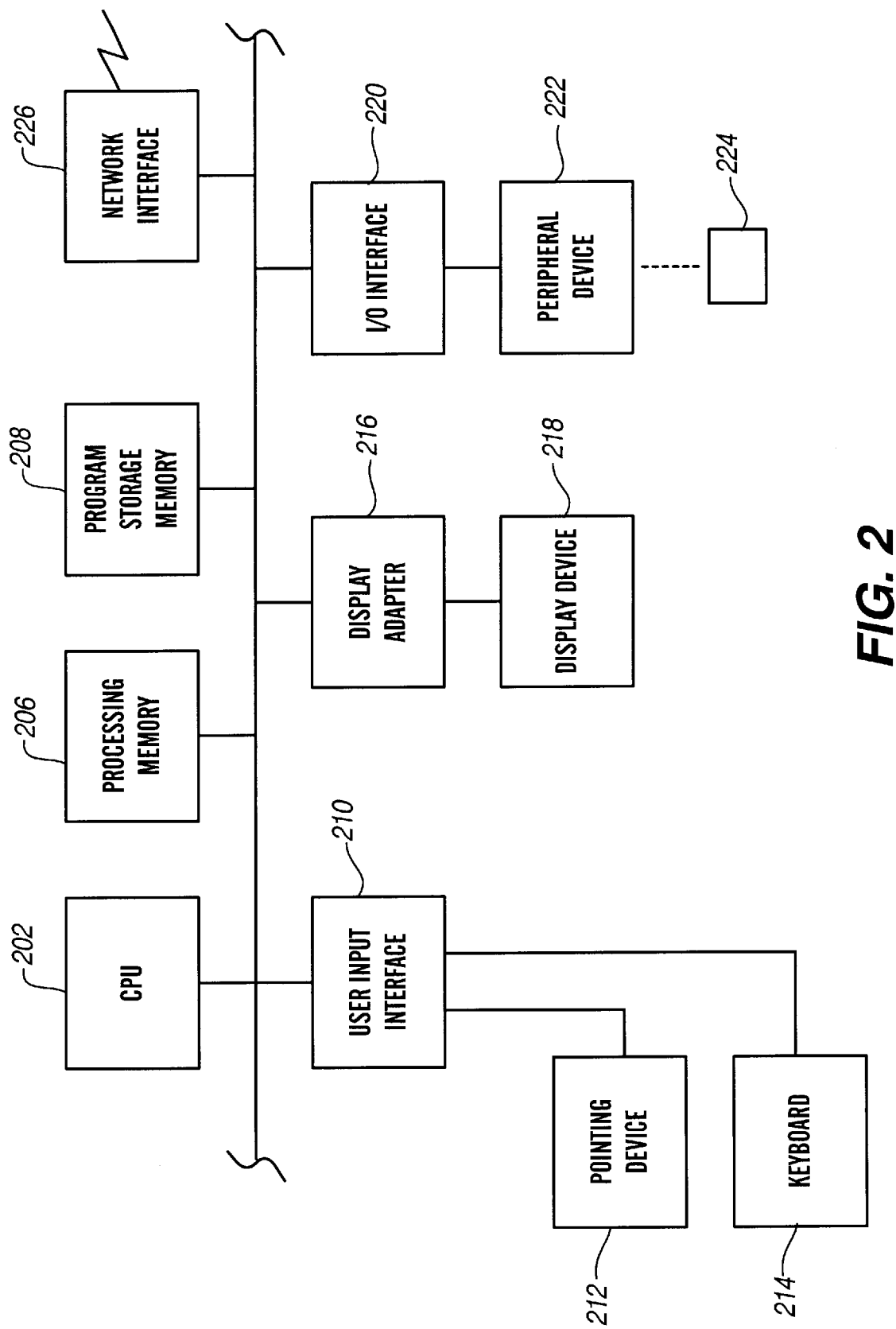
FIG. 2 is a block diagram of a general purpose computing system for use in connection with the system of FIG. 1.

In the preferred embodiment, the scheduling client 20, the data server 30, the business function server 40, the scheduling server 50 and the application servers 1 and 5 are implemented in a general purpose computing or information processing system such as processing system 200 (FIG. 2). The processing system 200 includes a central processing unit ("CPU") 202 connected by a bus 204 to a processing storage or memory device 206 and a program/data storage or memory device 208.

The processing system 200 further includes a user input interface 210 connected to the bus 204 for enabling user input via a pointing device 212, such as a mouse, and also with a keyboard device 214. To provide a visual display, the processing system 200 also includes a display device 218 connected to the bus 204 through a display adapter 216.

An input/output ("I/O") interface 220 is connected to the bus 204 to permit a peripheral device 222 to interface with the processing system 200. The peripheral device 222 includes a disk drive for reading and/or writing electronic information to computer-usable storage medium such as a magnetic disk 224. Other peripheral devices, including tape drives and compact disk drives, can also be incorporated into the processing system 200.

A network interface 226 is also connected to the bus 204 to enable the processing system 200 to access the network 7 (FIG. 1).

Figure 3:
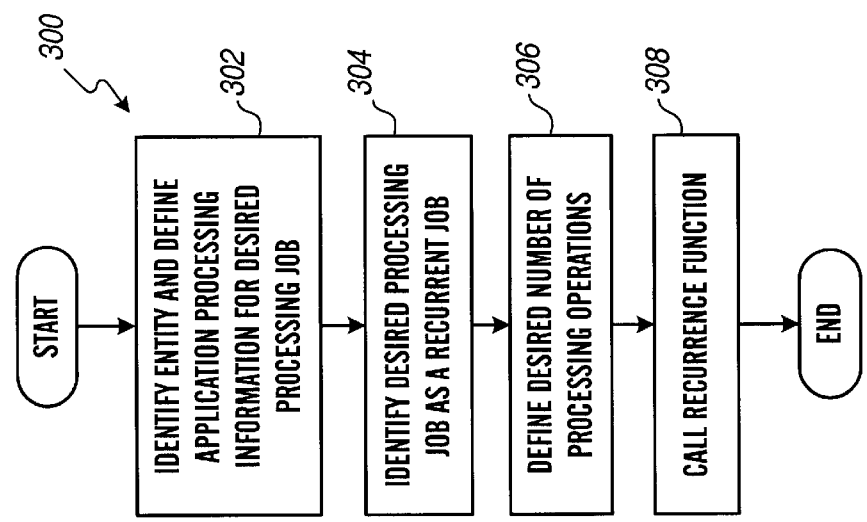
FIG. 3 is a flowchart illustrating a scheduling operation of the system of FIG. 1.

Referring now to FIG. 3, there is shown a flowchart 300 illustrating the scheduling operation of the scheduling client application 22 (FIG. 1). The scheduling operation begins by selecting or identifying an entity and defining the application processing information associated with the entity for a desired processing job at box 302. The application processing information can include an initial start time for the processing job, and a processing end date if desired. If appropriate, the processing job can be identified as a recurrent job at box 304.

A desired number of processing operations is defined at box 306. The desired number of processing operations indicates how many times the processing job will be submitted for processing. Where no processing end date is selected, the desired number of processing operations enables a new processing start date to be determined as described in more detail with regard to FIG. 6.

A call is made to invoke a recurrence function at box 308 to determine a set of processing start times for the processing job before the scheduling operation ends.

Figure 4:
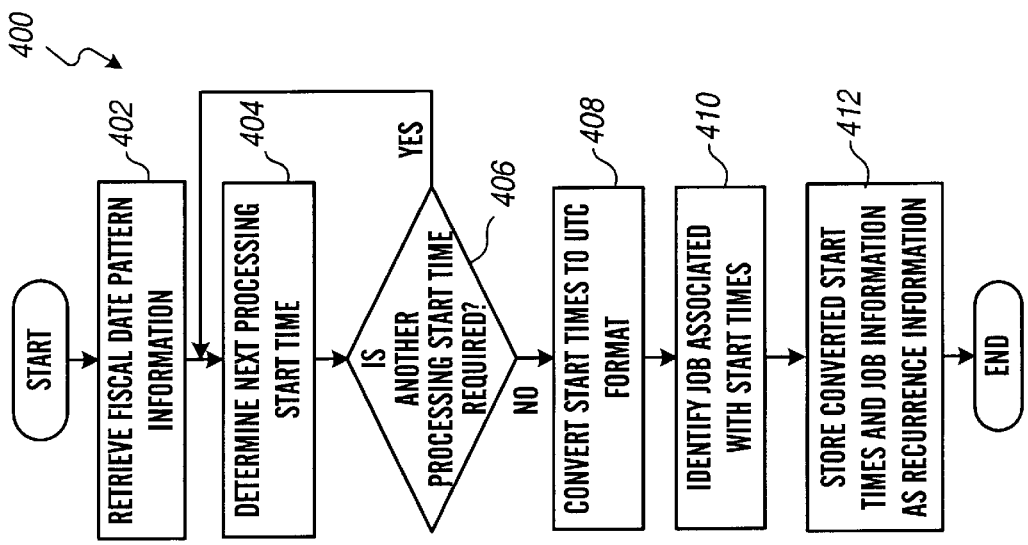
FIG. 4 is a flowchart illustrating a recurrence function operation of the system of FIG. 1.

Referring now to FIG. 4, there is shown a flowchart 400 illustrating the recurrence function operation of the recurrence function routine 42 (FIG. 1). The recurrence function routine initially retrieves the information processing period information, i.e., the fiscal date pattern information, for the selected entity from the entity information 34 as shown at box 402. Using the retrieved information processing period information, the recurrence function routine 42 determines the next-in-time application processing start time for the processing job at box 404.

A determination is made at decision box 406 as to whether another next-in-time processing start time is required. Factors for deciding if another processing start time is required include whether the processing job is a recurrent processing job, the existence of a processing end date, and a desired number of processing operations. If another processing start time is required, the next, next-in-time, processing start time is determined at box 404. Additional processing start times are determined in a similar manner until no more processing start times need to be determined.

When it is determined at decision box 406 that no additional processing start times need to be determined, the determined processing start times are converted at box 408 to the UTC format if they are in a non-UTC format. The scheduled processing job associated with the determined processing start times is identified at box 410 as job information, and the start times and job information is stored as recurrence information 38 in the last box 412.

Figure 5:
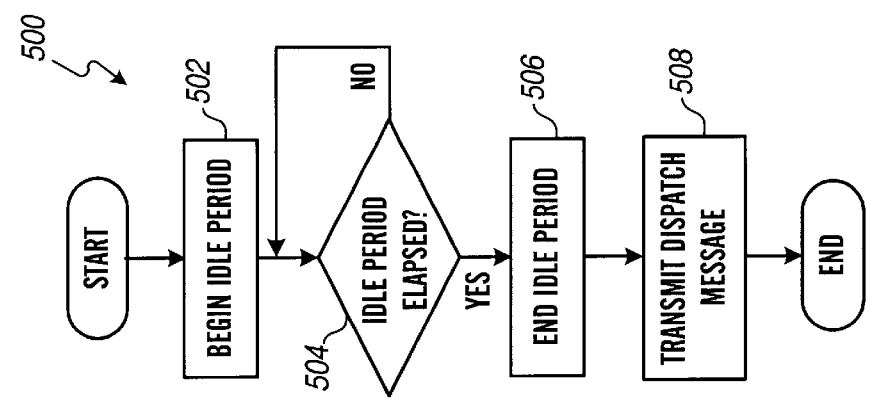
FIG. 5 is a flowchart illustrating an idle operation of the system of FIG. 1.

The idle operation of the communication middleware 26 (FIG. 1) for "waking" the scheduling server application 52 is illustrated as flowchart 500 in FIG. 5. The middleware 26 is initially set to begin an idle period at box 502. A decision is made at decision box 504 to determine if a predetermined idle period has elapsed. The idle period is preferably one minute or longer, and is more preferably about one minute in duration.

Where the idle period has not yet elapsed, the middleware 26 returns to the decision box 504 to determine if the idle period has finally elapsed. This determination process continues until it is determined at box 504 that the idle period has elapsed, wherein the end of the idle period is identified at box 506. Subsequently, a dispatch message is generated and transmitted by the middleware 26 to "wake" the scheduling server application 52 at box 508.

Figure 6:
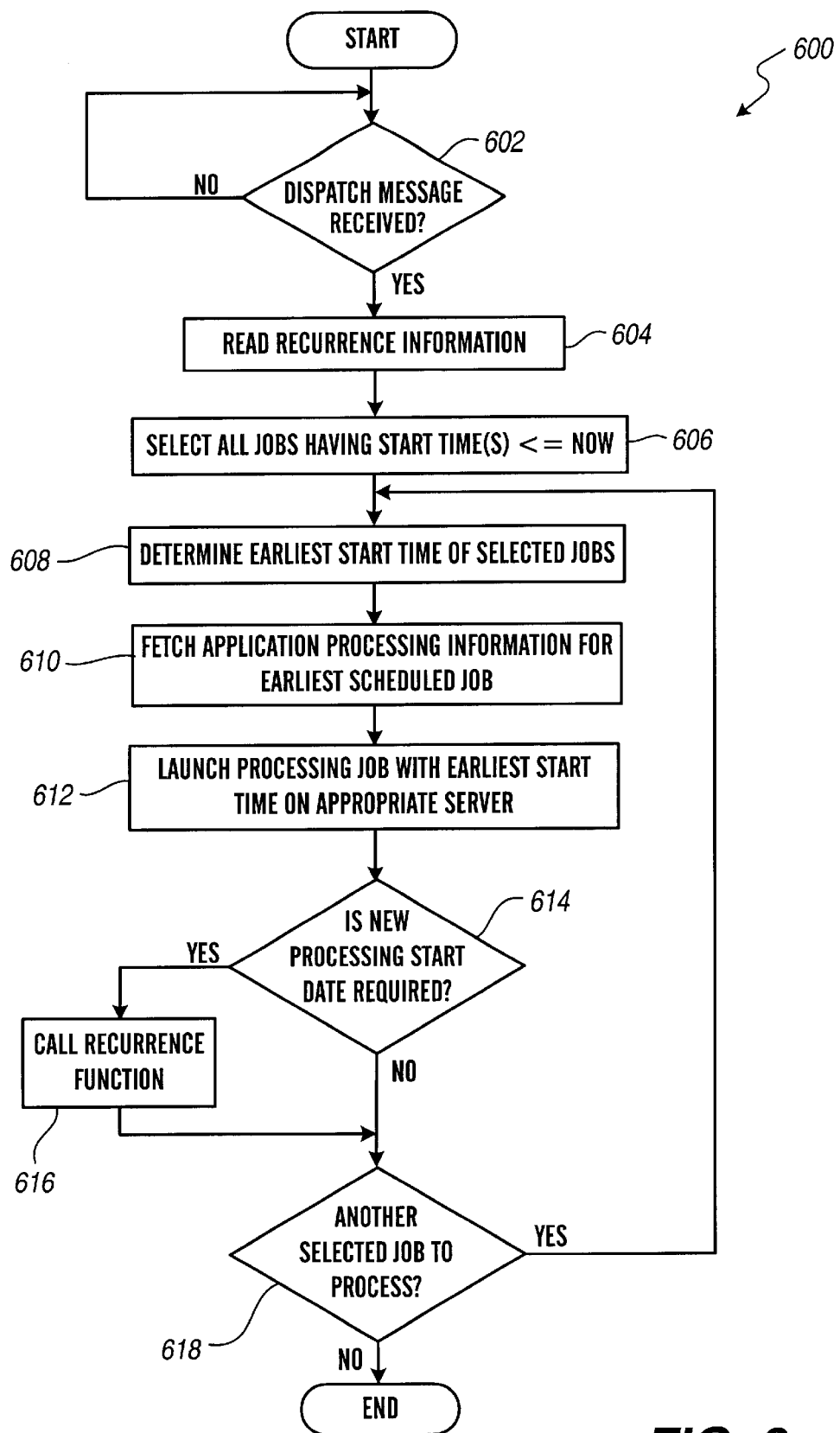
FIG. 6 is a flowchart illustrating a process launch operation of the system of FIG. 1.

Referring now to FIG. 6, there is shown a flowchart 600 illustrating the process launch operation of the scheduling server application 52 (FIG. 1) to process the scheduled recurrent processing jobs. The scheduling server application 52 is initially in a "sleep" state, and periodically checks for the receipt of a dispatch message from the communication middleware 26 as shown at decision box 602. The application 52 continues to check for the receipt of the dispatch message until one is received, wherein the application 52 is "awakened." Once "awake," the application 52 accesses or reads the stored recurrence information 38 at box 504.

The scheduled processing jobs having an earlier or current start time are selected at box 606, wherein the selected processing jobs are substantially current relative to the scheduling server application 52. Of the processing jobs selected at box 606, the application 52 determines the earliest one of the scheduled jobs at box 608 and fetches the application processing information 34 for that earliest scheduled job at box 610. The application 52 then launches the processing job with the earliest processing start time on the appropriate server as shown at box 612.

After the earliest scheduled job is launched, a determination is made at decision box 614 as to whether a new processing start date is required. For example, where no end date is specified, a new processing start date would be required after the launching of the earliest scheduled job. If a new processing start is not required, a decision is made at decision box 618 as to whether there is another scheduled job from the jobs selected at box 606 to process. If a new processing start date is required, the application 52 invokes the recurrence function at box 616 before making a determination at decision box 618 regarding the processing of another job.

If it is determined at decision box 618 that there is another selected job to process, the application 52 returns to box 608 to determine the next earliest start time for a selected job. Where it is determined at decision box 618 that there are no more selected jobs to process, the application 52 returns to the "sleep" state until the next dispatch message is received.

Figure 7A:
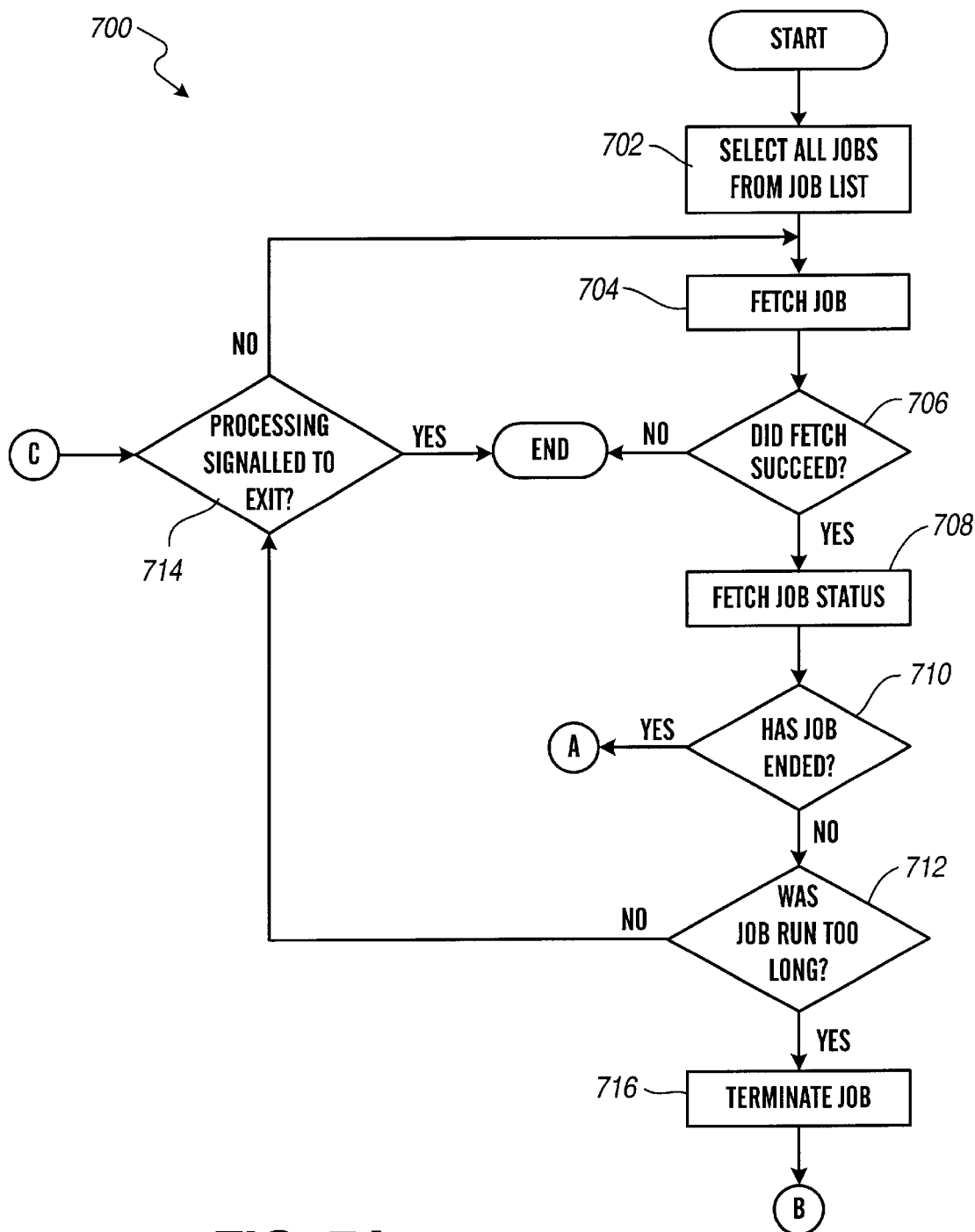
FIGS. 7A–7C contain a flowchart illustrating a job monitoring operation of the system of FIG. 1.
Figure 7B:
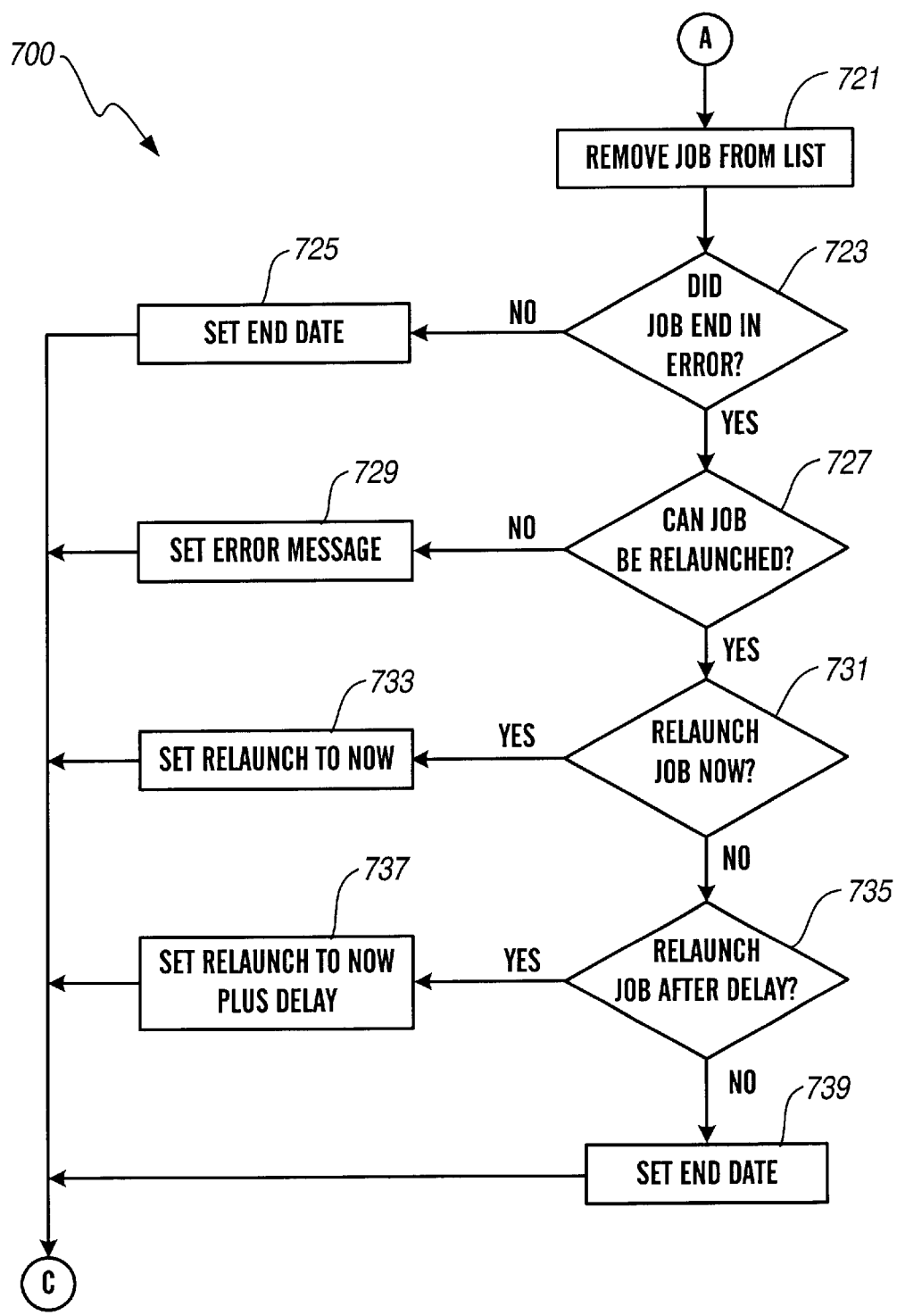
Figure 7C:
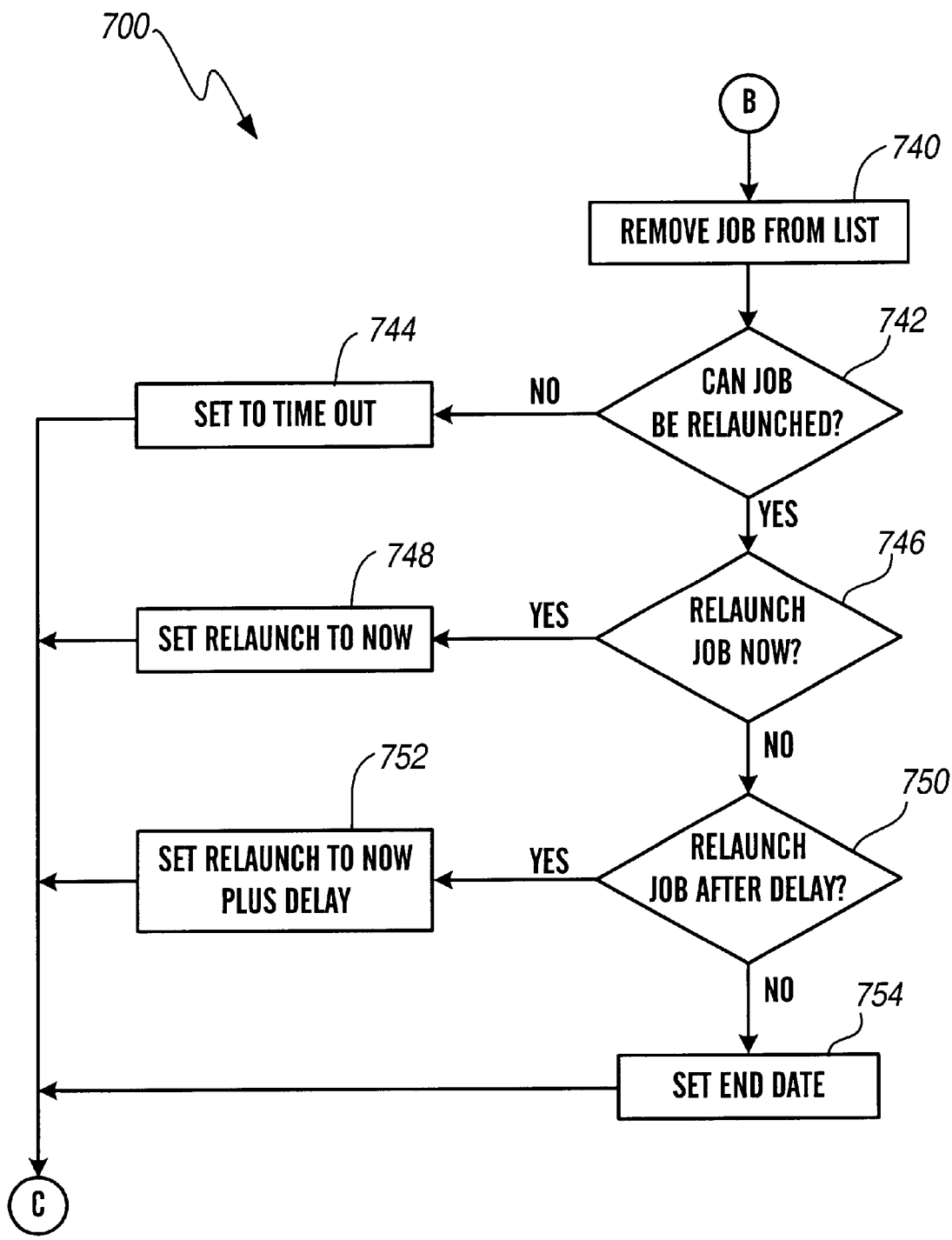

Referring now to FIGS. 7A–7C, there is shown a flowchart 700 illustrating the job monitoring operation of the job monitor application 54 (FIG. 1) to monitor the status of scheduled recurrent processing jobs. The job monitor application 54, like the scheduling server application 52, is responsive to the dispatch message transmitted by the communication middleware 26 to initially select processing jobs from a job list at box 702 (FIG. 7A). The current job is fetched at box 704, and a determination is made at decision box 706 as to whether the fetch operation succeeded. If the fetch operation did not succeed, the job monitoring operation ends.

Where the fetch operation was successful, the job status is fetched at box 708. Where the job status indicates the job has ended at decision box 710, the job is removed from the job list at box 721 (FIG. 7B). However, if it is determined that the job has not ended, a subsequent determination about the job running too long is made at decision box 712. A determination that the job has run too long causes the job to be terminated at box 716, and the job is then removed from the job list at box 740 (FIG. 7C).

If the determination at box 712 indicates that the job has not run too long, a determination is made at decision box 714 as to whether the process has been signalled to exit. When the process was signalled to exit, the job monitoring operation ends. Should there be no signal to exit, the current job is fetched at box 704.

Upon the job being removed from the list at box 721 (FIG. 7B), a determination is made at decision box 723 as to whether the job ended in error. If there was no error, the job end date is set at box 725 before the job monitoring operation proceeds to decision box 714 (FIG. 7A). When an error is detected at decision box 723, a determination is made at decision box 727 regarding the ability to relaunch the job.

Where the job cannot be relaunched, an error message is set at box 729 before the job monitoring operation proceeds to decision box 714 (FIG. 7A). If the job can be relaunched, a determination is made at decision box 731 as to whether the job can be relaunched immediately. A determination that the job can be relaunched causes the job to be set for relaunching now at box 733, and the job monitoring operation proceeds to decision box 714 (FIG. 7A). A determination that the job cannot be relaunched immediately is followed by a determination at decision box 735 as to whether the job can be relaunched after a delay period.

If the job can be relaunched after the delay period, the job is set to relaunch after the delay period at box 737. Otherwise, the job end date is set at box 739. Following either the resetting of the launch at box 737 or the setting of the job end date at box 739, the job monitoring operation proceeds to decision box 714 (FIG. 7A) to determine if the process was signalled to stop.

Upon the job being removed from the list at box 740 (FIG. 7C), a determination is made at decision box 742 regarding the ability to relaunch the job. A determination that the job cannot be relaunched causes the job to be set to time out at box 744, and the job monitoring operation proceeds to decision box 714 (FIG. 7A). If the job can be relaunched, a determination is made at decision box 746 as to whether the job can be relaunched now.

A determination that the job can be relaunched now causes the job to be set for relaunching now at box 748, and the job monitoring operation proceeds to decision box 714

(FIG. 7A). A determination that the job cannot be relaunched immediately is followed by a determination at decision box 750 as to whether the job can be relaunched after a delay period.

If the job can be relaunched after the delay period, the job is set to relaunch after the delay period at box 752. Otherwise, the job end date is set at box 754. Following either the resetting of the launch at box 752 or the setting of the job end date at box 754, the job monitoring operation proceeds to decision box 714 (FIG. 7A) to determine if the process was signalled to stop.

Figure 8:
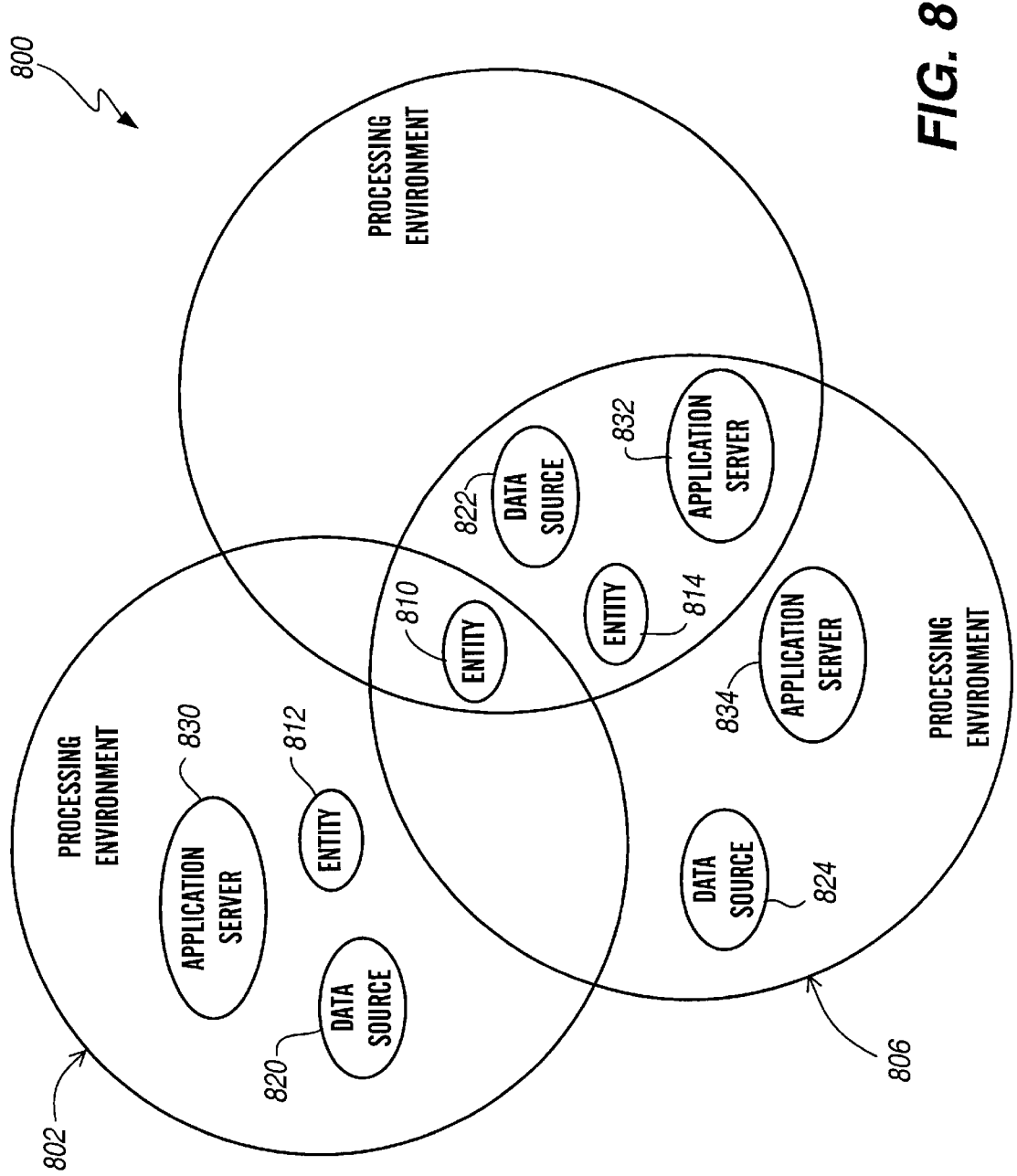
FIG. 8 is a diagram illustrating exemplary processing environments.

Referring now to FIG. 8, there is shown a diagram illustrating exemplary processing environments, such as environments 802, 804 and 806, for a system for processing a recurrent processing job, such as system 10 (FIG. 1). The environments 802, 804 and 806 enable the system 10 to limit access by the user to only the resources in the environment that are associated with the user.

Each one of the processing environments 802, 804 and 806 defines at least one entity information source associated with a processing job, at least one data source for supplying application processing information and recurrence information, and at least one application server for processing the processing job. The entity information sources include sources 810, 812 and 814. The data sources include data sources 820, 822 and 824. The application servers include application servers 830, 832 and 834.

As shown in FIG. 8, the processing environment 802 includes the entity information sources 810 and 812, the data source 820, and the application server 830. Processing environment 804 includes the entity information sources 810 and 814, the data source 822, and the application server 832. Processing environment 806 includes the entity information source 814, the data sources 822 and 824, and the application servers 832 and 834.

When the user signs into one of the environments 802, 804 or 806, the user can only access the resources associated with that one environment. In this way, the system 10 (FIG. 1) can control the resources used to launch recurrent processing jobs.

While particular embodiments of the present invention were disclosed, it is to be understood that various different modifications are possible and are contemplated within the true spirit and scope of the appended claims. There is no intention, therefore, of limitations to the exact abstract or disclosure presented herein.

What is claimed is:

1. A system for processing a recurrent operation, comprising:

processor means for processing application processing information;

storage means for maintaining entity information including first user defined period information indicative of information processing periods for a first entity and second user defined period information indicative of information processing periods for a second entity;

schedule means for defining application processing information for a first desired processing job associated with said first entity and a second desired processing job associated with said second entity, and for identifying said first and second desired processing jobs as a recurrent processing jobs;

function means for determining recurrence information including a set of processing start times corresponding to said information processing periods and information identifying said desired processing jobs associated with said processing start times; and launch means for accessing said recurrence information to identify a current desired processing job based on a substantially current one of said processing start times corresponding to one of said first and second desired processing jobs, and for submitting said current desired processing job to said processor means for processing.

2. A system according to claim 1, wherein said first user defined period information includes fiscal date pattern information for said first entity.

3. A system according to claim 1, wherein said processing start times are maintained according to a decentralized time format.

4. A system according to claim 3, wherein said decentralized time format is universal coordinated time.

5. A system according to claim 1, wherein said function means is responsive to said launch means submitting said current desired processing job to generate a new processing start time for said current desired processing job.

6. A method for processing a recurrent operation, comprising:

maintaining entity information including first period information indicative of information processing periods for a first entity and second period information indicative of information processing periods for a second entity;

defining application processing information for a first desired processing job associated with said first entity and for a second desired processing job associated with said second entity;

identifying said first and second desired processing jobs as a recurrent processing jobs;

determining recurrence information including a set of processing start times corresponding to said information processing periods and information identifying said first and second desired processing jobs associated with first and second processing start times;

identifying a substantially current one of said first and second processing start times and identifying one of said first and second desired processing jobs as a current desired processing job corresponding to said substantially current one of said first and second processing start times; and submitting said current desired processing job for processing.

7. A method according to claim 6, further including maintaining said processing start times according to a decentralized time format.

8. A method according to claim 6, further including generating a new processing start time for said current desired processing job in response to said current processing job being submitted.

9. A system for processing a recurrent operation on a network, comprising:

a group of geographically dispersed application processor means, including first and second processor means, coupled to the network for processing application processing information, each of said first and second application processor means having an associated time zone;

storage means for maintaining entity information including user defined period information indicative of information processing periods for an entity;

schedule means for defining application processing information for a desired processing job associated with said entity, and for identifying said desired processing job as a recurrent processing job;

function means for determining recurrence information including a set of processing start times corresponding to said information processing periods and information identifying said desired processing job associated with said processing start times; and launch means for accessing said recurrence information to identify a substantially current one of said processing start times, and for submitting said desired processing job corresponding to said current processing start time to one of said application processor means for processing;

wherein said processing start times are maintained according to a decentralized time format to enable said launch means to submit said desired processing job to said first application processor means relative to a common time basis that is not dependent on said time zone associated with said first application processor means.

10. A system according to claim 9, wherein said decentralized time format is universal coordinated time.

11. A system according to claim 9, wherein said storage means further maintains system information to facilitate the submission of said desired processing job to said first application processor means.

12. A system for processing a recurrent operation on a network, comprising:

a scheduling client coupled to said network, operable to receive job processing information from a user, said job processing information including user defined period information;

a data server coupled to said network, operable to store said job processing information;

a business function server coupled to said network, operable to determine recurrence information from said job processing information and store said recurrence information with said data server, said recurrence information including a first start time for a first processing job associated with said job processing information;

a scheduling server coupled to said network, operable to access said recurrence information and submit said first processing job to an application server when said first start time is substantially equivalent to a current time.

13. A system according to claim 12, wherein said business function server is further operable to revise said recurrence information when said first processing job is submitted to said application server.

14. A system according to claim 12, wherein said period information includes fiscal date pattern information associated with said first processing job.

15. A system according to claim 12, wherein said first start time is maintained according to a decentralized time format.

16. A system according to claim 15, wherein said decentralized time format is universal coordinated time.

17. A system according to claim 12, wherein said scheduling server includes a job monitor application operable to access said application server and monitor progress of said first processing job.

18. A system according to claim 17, wherein said job monitor application is operable to re-submit said first processing job when said application server does not successfully complete said first processing job.

* * * * *